United States Patent
Oda et al.

(10) Patent No.: US 11,597,126 B2
(45) Date of Patent: Mar. 7, 2023

(54) METHOD FOR PRODUCING CARBON FIBER REINFORCED RESIN MOLDED ARTICLE, AND APPARATUS FOR PRODUCING CARBON FIBER REINFORCED RESIN MOLDED ARTICLE

(71) Applicant: NISSAN MOTOR CO., LTD., Yokohama (JP)

(72) Inventors: Takashi Oda, Kanagawa (JP); Katsumi Morohoshi, Kanagawa (JP); Kenichi Horai, Osaka (JP); Takashi Komiyama, Hyogo (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 249 days.

(21) Appl. No.: 16/761,562

(22) PCT Filed: Nov. 5, 2018

(86) PCT No.: PCT/IB2018/001399
§ 371 (c)(1),
(2) Date: May 5, 2020

(87) PCT Pub. No.: WO2019/086957
PCT Pub. Date: May 9, 2019

(65) Prior Publication Data
US 2020/0269475 A1 Aug. 27, 2020

(30) Foreign Application Priority Data
Nov. 6, 2017 (JP) ............................. JP2017-213666

(51) Int. Cl.
*B29C 43/04* (2006.01)
*B29C 43/34* (2006.01)
(Continued)

(52) U.S. Cl.
CPC ............ *B29C 43/34* (2013.01); *B29C 43/003* (2013.01); *B29C 43/04* (2013.01); *B29C 70/54* (2013.01);
(Continued)

(58) Field of Classification Search
CPC .................. B29C 43/003; B29C 43/04; B29C 2043/3411; B20K 2101/00; B29K 2307/04
(Continued)

(56) References Cited

FOREIGN PATENT DOCUMENTS

CN 106945064 A 7/2017
JP 2008-254438 A 10/2008
(Continued)

OTHER PUBLICATIONS

Frank Chen, "Construction Formwork Production Line LFT D", and Annex, Apr. 10, 2014, 5 pages, XP054982282, retrieved from the Internet on Sep. 24, 2021: URL:https://www.youtube.com/watch?v=sTZBZpew-2k.
(Continued)

*Primary Examiner* — Jeffrey M Wollschlager
*Assistant Examiner* — Xue H Liu
(74) *Attorney, Agent, or Firm* — Foley & Lardner LLP

(57) ABSTRACT

A method for producing carbon fiber reinforced resin molded article of the present invention includes press-molding a mixture-made body including carbon fiber and thermoplastic resin to produce the article that is composed of CFRP.
The method further includes perforating pores into the mixture-made body, before press-molding mentioned above. As, in perforating, at least the pores are formed so as to penetrate through a hardened part of a surface of the
(Continued)

mixture-made body, the article made of the CFRP that does not have poor appearance, such as whitening or marble pattern, can be produced.

18 Claims, 7 Drawing Sheets

(51) Int. Cl.
  *B29C 43/00* (2006.01)
  *B29C 70/54* (2006.01)
  *B29K 101/00* (2006.01)
  *B29K 307/04* (2006.01)
(52) U.S. Cl.
  CPC ... *B29C 2043/3411* (2013.01); *B29K 2101/00* (2013.01); *B29K 2307/04* (2013.01)
(58) Field of Classification Search
  USPC .......................................................... 264/310
  See application file for complete search history.

(56) References Cited

FOREIGN PATENT DOCUMENTS

| JP | 2012-148443 A | 8/2012 |
|----|---------------|--------|
| JP | 2013-22852 A  | 2/2013 |
| JP | 2013-173330 A | 9/2013 |
| JP | 2014-124834 A | 7/2014 |

OTHER PUBLICATIONS

European Office Action, Application No. 18872628.5, dated Oct. 5, 2021, 8 pages.

METHOD FOR PRODUCING CARBON FIBER REINFORCED RESIN MOLDED ARTICLE, AND APPARATUS FOR PRODUCING CARBON FIBER REINFORCED RESIN MOLDED ARTICLE

TECHNICAL FIELD

The present invention relates to a method for producing a carbon fiber reinforced resin molded article, and more particularly relates to a method for producing a carbon fiber reinforced resin molded article and to an apparatus for producing a carbon fiber reinforced resin molded article, in which a mixture-made body including carbon fiber and thermoplastic resin is press-molded.

BACKGROUND ART

A carbon fiber reinforced resin molded article (hereinafter sometimes referred to as "CFRP") is a breakthrough light weight material having excellent specific rigidity and specific strength as compared to a metal material, such as a steel material. However, since the producing cost is high, it is difficult to use as a material for general purpose. Therefore, it is highly desirable to reduce the price of a CFRP.

An autoclave method and a resin transfer molding (RTM) method are known as methods for producing the CFRP as described above. However, these producing methods employ sheets of woven fabric or non-woven fabric or the like made from carbon fiber, and, since it is difficult to stretch the carbon fiber sheets as described above, it is difficult to mold them. Due to this, a significant number of steps and considerable amount of time are required, and thus it is difficult to reduce the price of a CFRP.

Moreover, it is also possible to produce a CFRP by an injection molding method. However, when normal pressure is employed for injection, then it is necessary to shorten the carbon fiber, and it is only possible to obtain a CFRP with low mechanical strength. In order to compensate for this poor physical property, the thickness of the CFRP must be increased by using more material. Therefore, it is difficult to achieve both increase of mechanical strength and price reduction of a CFRP with the injection molding method.

As a producing method that can achieve both the mechanical strength and the price reduction of a CFRP, there is a Long Fiber Thermoplastic Direct (LFT-D) method.

The LFT-D method is a method for producing a LFT-D mixture-made body (a compound of thermoplastic resin and carbon fiber. Hereinafter sometimes referred to as "COMPOUND"), in which continuous carbon fiber wound around a bobbin are introduced into a kneading machine together with thermoplastic resin, and the carbon fiber are cut into appropriate lengths by the shearing force of screws while the resin is incited and kneaded.

By performing press-molding before a compound produced by the LFT-D method cools down to obtain a molded product, there is no requirement to employ an intermediate base material such as a prepreg or a preform, unlike the conventional typical CFRP method.

Accordingly, it makes a simple molding, in which a COMPOUND is simply pressed, possible, so that it is possible to reduce the cost of a CFRP.

In JP2012-148443A (Patent Document 1) discloses a method of producing a fiber reinforced resin material having a ribbed structure by mounting ribs that is obtained by press-molding a mixture-made body to which the LFT-D method is applied upon a panel that is obtained by press processing of a resin material formed from a fiber material and thermoplastic resin, followed by further performing press processing to integrate the panel and the ribs together.

Furthermore, according to the producing method described above, it is described that sink marks that may occur on the surface of the panel on its opposite side from its surface to which the ribs are attached can be effectively eliminated.

PRIOR ART DOCUMENTS

Patent Document

Patent document 1: JP2012-148443A

SUMMARY OF INVENTION

Technical Problem

However, with the fiber reinforced resin material of Patent document 1, the design face side is a panel and is not derived from a COMPOUND. Moreover, the occurrence of poor appearance, such as whitening and marble pattern, is not prevented. Here, whitening is a phenomenon, in which the surface of a CFRP that is obtained by press-molding the COMPOUND described above appears whitish.

Namely, with the method for producing a CFRP, in which the COMPOUND described above is press-molded, the COMPOUND is not injected into the mold in the molten state as in the case of injection molding, but rather the COMPOUND is taken out from the kneading machine and then is placed into the mold after its shape is adjusted, and press-molding is performed subsequently.

And, when spreading and shaping the COMPOUND, the COMPOUND expands due to forces generated from the carbon fiber in the COMPOUND returning to its original state, and entrains surrounding air.

Furthermore, in order for the COMPOUND to be conveyed to the mold and to be placed therein, it is necessary for the COMPOUND to have a certain level of self-supporting capability. The surface of the COMPOUND inevitably is hardened because the COMPOUND is exposed to the external air and cooled while it is placed in the mold after it is taken out from the kneading machine.

When a COMPOUND whose surface has been hardened in this manner is press-molded just as it is, air bubbles that are included in the COMPOUND are stretched out by the press-molding process into linear shapes, and the surface of the CFRP appears whitish (whitening), due to reflection that occurs at the interfaces between the thermoplastic resin and the air bubbles.

Furthermore, reflection occurs at the boundary between the part on the surface of the COMPOUND that is hardened earlier and the internal part that is hardened later, and the result is that multiple layers of shapes that appear flowing are overlapped, and marble pattern looking like being rolled are generated.

In particular, in a COMPOUND including carbon fiber that are long, the restoring forces of the carbon fiber are strong and the thermal conductivity is high. Therefore, poor appearance as described above can easily occur, since entrainment of air and curing of the surface are significant.

The present invention has been made in consideration of problems of this type with the prior art, and an object thereof is to provide a method for producing a carbon fiber reinforced resin molded article, that is capable of preventing the poor appearance from being generated.

Solution to Problem

As a result of diligent investigations in order to attain the objective described above, the present inventors have found that it is possible to achieve the objective described above by forming pores that penetrate through the hardened part of the surface of the mixture-made body before press-molding, and have thereby brought the present invention to completion.

In other words, the method for producing a carbon fiber reinforced resin molded article of the present invention is a method for producing a carbon fiber reinforced resin molded article, in which a CFRP is obtained by press-molding a mixture-made body in that carbon fiber and thermoplastic resin are melted and kneaded.

Moreover, this method includes perforating pores into the mixture-made body, before press-molding, and the pores described above are pores that penetrate through at least a hardened part of the surface of the mixture-made body.

Moreover, the apparatus for producing a carbon fiber reinforced resin molded article of the present invention includes a conveyance device and a press-molding device. And the conveyance device includes at least an arm and a holding portion provided to said arm.

The mixture-made body in that carbon fiber and thermoplastic resin are melted and kneaded is held by the holding portion of the conveyance device, and is placed upon a mold of the press-molding device and is press-molded.

The holding portion and/or the mold includes spike shaped members.

The mixture-made body is stabbed by the spike shaped members, and press-molding is performed after pores that penetrate through at least a hardened part of the surface of the mixture-made body have been formed.

Advantageous Effects of Invention

Since, according to the present invention, the pores that penetrate through the hardened part of the surface of the mixture-made body is formed before the press-molding, it is possible to provide a method for producing a carbon fiber reinforced resin molded article, in which a CFRP that does not have poor appearance, such as whitening or marble pattern, can be produced.

DESCRIPTION OF EMBODIMENTS

Figure 1:
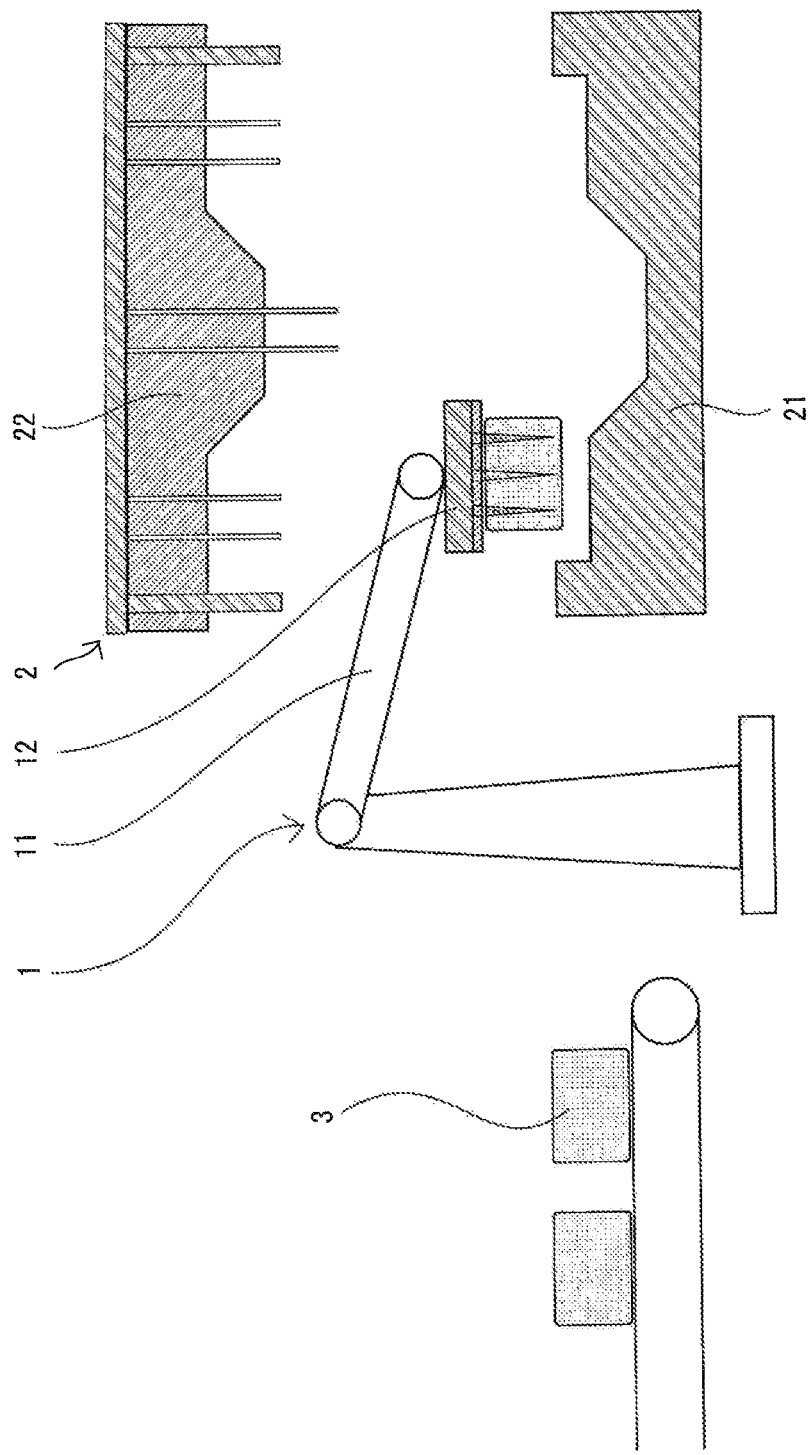
FIG. 1 is a schematic figure showing an apparatus for producing a carbon fiber reinforced resin molded article according to the present invention.

The method for producing a carbon fiber reinforced resin molded article of the present invention will now be explained in detail.

This producing method is a method of obtaining a carbon fiber reinforced resin molded article by press-molding a mixture-made body including carbon fiber and thermoplastic resin, and includes perforating, in which pores penetrating through at least a hardened part of the surface of the mixture-made body are formed, before press-molding.

With the present invention, since the pores that penetrate through the hardened part of the surface of a COMPOUND are formed before the COMPOUND is pressed, accordingly, by pressing the COMPOUND, an internal COMPOUND with high fluidity can be ejected from the through pores described above to the surface, and the hardened part can be broken into small pieces in a reproducible manner.

Accordingly, the hardened part of the surface can be covered and hidden by embedding the COMPOUND that has high fluidity, so that it is possible to prevent occurrence of the poor appearance.

With the present invention, the term "hardened part" means a part whose fluidity is reduced and that has self-supporting properties, and this means a range in which, when a COMPOUND is cut vertically, the thermoplastic resin remains just as it is without flowing out.

The thickness of the hardened part that is generated due to normal transport is typically around 0.5 mm.

Although the diameter of the pores described above depends on the thickness of the COMPOUND arranged on the mold and the lengths of the carbon fiber within the COMPOUND, this pore diameter is preferably 3 mm to 10 mm. By the diameter of the pores being within the above range, an internal COMPOUND with high fluidity is ejected to the surface.

An interval between adjacent pores is preferably 5 mm to 30 mm, although this depends on the thickness of the COMPOUND, the shape of the mold, and so on. Due to the interval between pores being in the range described above, it becomes easy for the hardened part to be broken into small pieces and become embedded in the interior of the CFRP.

The arrangement of the pores can be changed depending on the shape of the CFRP, and it is not limited as long as the hardened part can be broken into small pieces; although they can be arranged randomly, it is preferable for them to be arranged regularly. By arranging the pores regularly it becomes easy for the COMPOUND with high fluidity to be ejected in an even manner, so that it is possible to cover and hide the entire hardened part.

With the present invention, the term "arranged regularly" does not mean that all of the pores must be arranged according to the same rule; it is sufficient if it includes a portion that is arranged at a regular interval, and/or a portion in which certain repeating units are arranged continuously.

The pores described above may be formed on either the upper surface or the lower surface of the COMPOUND that are arranged on the mold, or both on the upper surface and the lower surface of the COMPOUND. However, they are preferably formed at least on the design face side.

The design face is the face that constitutes the surface shape of the CFRP, and it is possible efficiently to prevent generation of the poor appearance by perforating the surface that is visible to a user.

The perforating may be performed after the COMPOUND has been taken out from the kneading machine and before press-molding is performed, and may be performed when the COMPOUND that has been shaped is placed on the mold or after it has been placed on the mold. However, it is preferably performed on the COMPOUND after it has been placed on the mold.

Due to the formation of the pores, it becomes easier for the COMPOUND to cool down and its fluidity decreases. However, by performing press-molding immediately after formation of the pores, decrease of the fluidity of the COMPOUND is prevented, and it is also possible to prevent the COMPOUND from cooling down by heating the mold in advance.

The pores may be formed by stabbing the COMPOUND with spike shaped members. Examples of spike shaped members that may be cited include nail shaped members, needle shaped members, thorn shaped members, and so on.

The spike shaped members are preferably heated. By heating the spike shaped members, it is possible to prevent heat of the COMPOUND from escaping via the spike shaped members, so that it is possible to prevent the COMPOUND from cooling down.

Furthermore, the deeper the pores that are formed are, the better, and they may penetrate, not only through the hardened part of the surface, but also through the entire COMPOUND.

However, when the perforating is performed on the mold, in order to form pores that penetrate through the entire COMPOUND, it is necessary for the mold to have a guard for the spike shaped members, which increases the cost. Therefore, it is preferred that the pores are slightly less deep than the thickness of the COMPOUND placed on the mold.

The spike shaped members are preferably porous bodies.

By the spike shaped members being porous bodies that are gas-permeable, such as sintered bodies of metal particles or the like, it is possible to suck out and eliminate gas included in the COMPOUND via the spike shaped members, so that it is possible to prevent whitening due to gas in the COMPOUND.

The average length of the carbon fiber in the COMPOUND is preferably 0.5 mm or greater and 50 mm or less, and more preferably is 3 mm to 30 mm, although this depends on the shape of the CFRP and its intended purpose and so on.

By the average fiber length being in the range described above, it is possible to achieve both good appearance and mechanical strength of the CFRP simultaneously. If the average fiber length is too long, then clumps of intertwined carbon fiber can easily appear on the surface, and this may deteriorate the appearance. Moreover, if the average fiber length is too short, then the mechanical strength of the resulting molding is reduced, and it is only possible to obtain the same level of strength as that of an injection molded material.

The average fiber length of the carbon fiber may be adjusted by the kneading time, the rotational speed of a screw, the shape of a screw, and so on employed in the production of the COMPOUND by the LFT-D method.

More specifically, continuous long carbon fiber that are wound around a bobbin is continuously fed, while being unwound from the bobbin, into a twin-screw extrusion kneading machine that melts and kneads thermoplastic resin.

And it is possible to continuously produce a COMPOUND containing carbon fiber that have been adjusted to the desired length by cutting the carbon fiber into appropriate length with the shearing force of the screws while the fiber are being kneaded into the thermoplastic resin, and by extruding the kneaded material from the kneading machine.

Preferably, the fiber content of carbon fiber in the COMPOUND described above is 50~60% by weight. Since the fiber content of the carbon fiber exerts a large influence on the rigidity and the strength of the CFRP, the mechanical strength decreases when the fiber content of carbon fiber is reduced, so that it is difficult to use the resulting material as an alternative to a metal material, such as steel or the like.

Examples of the carbon fiber include polyacrylonitrile (PAN) based carbon fiber, petroleum/coal pitch-based carbon fiber, rayon based carbon fiber, vapor grown type carbon fiber, and so on; and these may be used either alone or in combinations of two or more.

Examples of the thermoplastic resin include, for example, polyamide resin, polyolefin resin, polystyrene resin, polyester resin, polyacetal resin (polyoxymethylene resin), polycarbonate resin, (meth)acrylic resin, polyarylate resin, polyphenylene ether resin, polyether nitrile resin, phenoxy resin, polyphenylene sulfide resin, polysulfone resin, polyketone resin, polyether ketone resin, urethane resin, fluorine based resin, polybenzoimidazole resin, and so on.

In the method for producing a carbon fiber reinforced resin molded article described above, large sized COMPOUNDs need to be arranged, and it is possible to obtain a CFRP that does not have poor appearance, even in the case the COMPOUNDs easily cool down.

Furthermore, since with this method a CFRP having sufficient mechanical strength is obtained, large sized components for automobiles which conventionally have been formed with metal material can be replaced with the above CFRP. For example, the above CFRP can be appropriately employed in the production of large sized components having surface area on the design face of 0.3 $m^2$ to 5 $m^2$.

Examples of the large sized components described above include, for example, a roof panel, a floor panel, a front bulkhead (firewall), a rear seat back panel, and so on.

Next, an apparatus for producing a carbon fiber reinforced resin molded article will be explained.

As shown in FIG. 1, this producing device comprises a conveyance device 1 and a press-molding device 2, and also, according to requirements, it may include a heat application device not shown in the figures that applies heat to the spike shaped members described above and to the mold, and a suction device not shown in the figures that sucks away gas via the spike shaped members.

The conveyance device 1 is adapted to place a COMPOUND 3 that has been taken out from a kneading machine on a mold of the press-molding device 2, and comprises a multiaxial type arm 11 that can turn freely and a holding portion 12 that is provided on that arm.

And the COMPOUND 3 is held by the holding portion 12, and are placed on the mold by motion of the arm 11.

The press-molding device 2 comprises a mold, which forms a cavity between a fixed mold 21 and a movable mold 22, and molding is made by pressing the COMPOUND 3 placed in the fixed mold 21.

The spike shaped members S may be provided on either one of the holding portion and the mold, or on both of the holding portion and the mold.

Figure 2:
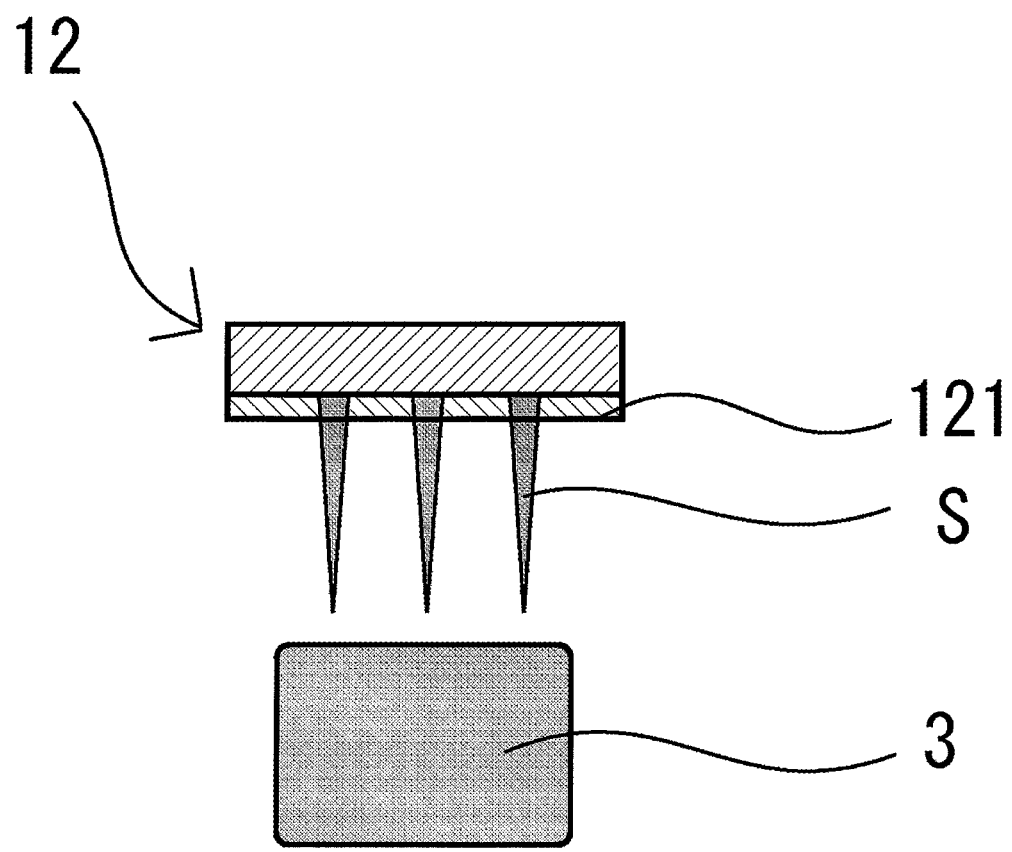
FIG. 2 is a schematic figure showing an example of a holding portion of a conveyance device.

As shown in FIG. 2, the holding portion 12 comprises a movable plate 121 and spike shaped members S that penetrate through the movable plate S.

Figure 3:
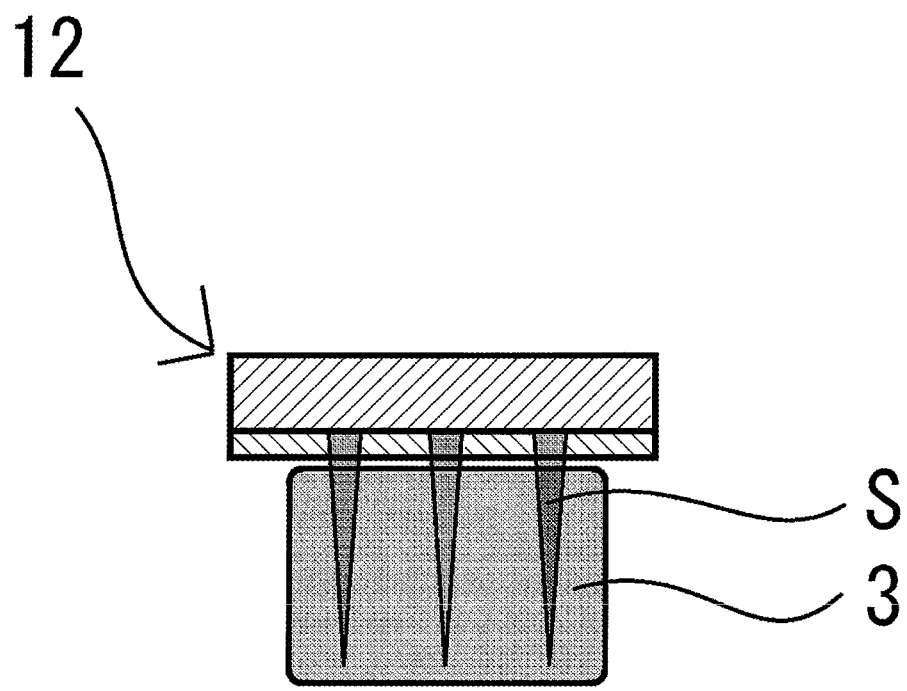
FIG. 3 is a schematic figure showing a state in which POUND is being held by the holding portion.
Figure 4:
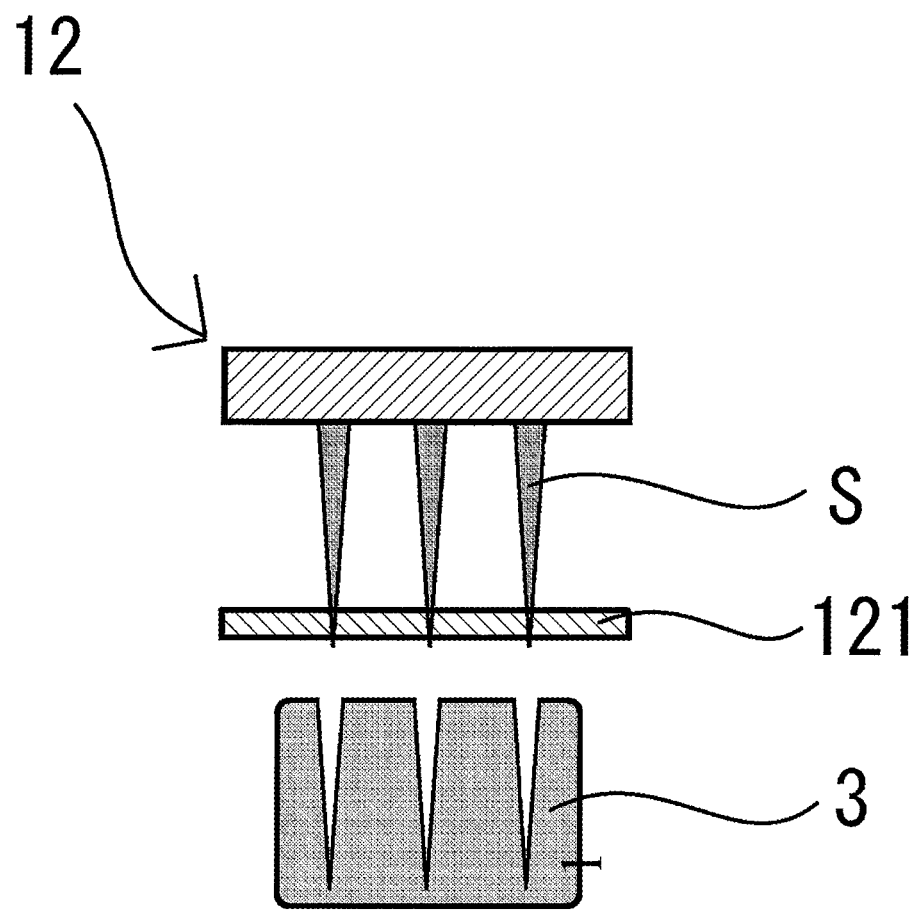
FIG. 4 is a schematic figure showing a state in which the COMPOUND is released by the holding portion.

And the COMPOUND 3 is stabbed by the spike shaped members S and lifted them up as shown in FIG. 3, and then the movable plate 121 is shifted so as to remove the spike shaped members S from the COMPOUND 3 and to place it on the mold, as shown in FIG. 4.

At this time, not only can gas in the COMPOUND be eliminated by sucking by the suction device not shown in the figures via the porous spike shaped members S, but also falling off of the COMPOUND 3 can be prevented.

When the spike shaped members are not provided on the holding portion, then a conventionally known holding member that grasps and holds the COMPOUND can be employed. It is preferable for the pores to be formed all at once by stabbing COMPOUNDs that are already placed on the mold with the spike shaped members arranged like a kenzan (frog).

In the mold described above, as shown in FIG. 5, the movable mold 22 has spike insertion pores, and the spike shaped members S are provided within these insertion pores. The spike shaped members S are connected to a return pin R via a plate 23, and, when the mold is closed, the return pin R comes into contact against a parting line surface P of the other mold, and the spike shaped members S are retracted into the spike insertion pores.

Figure 5:
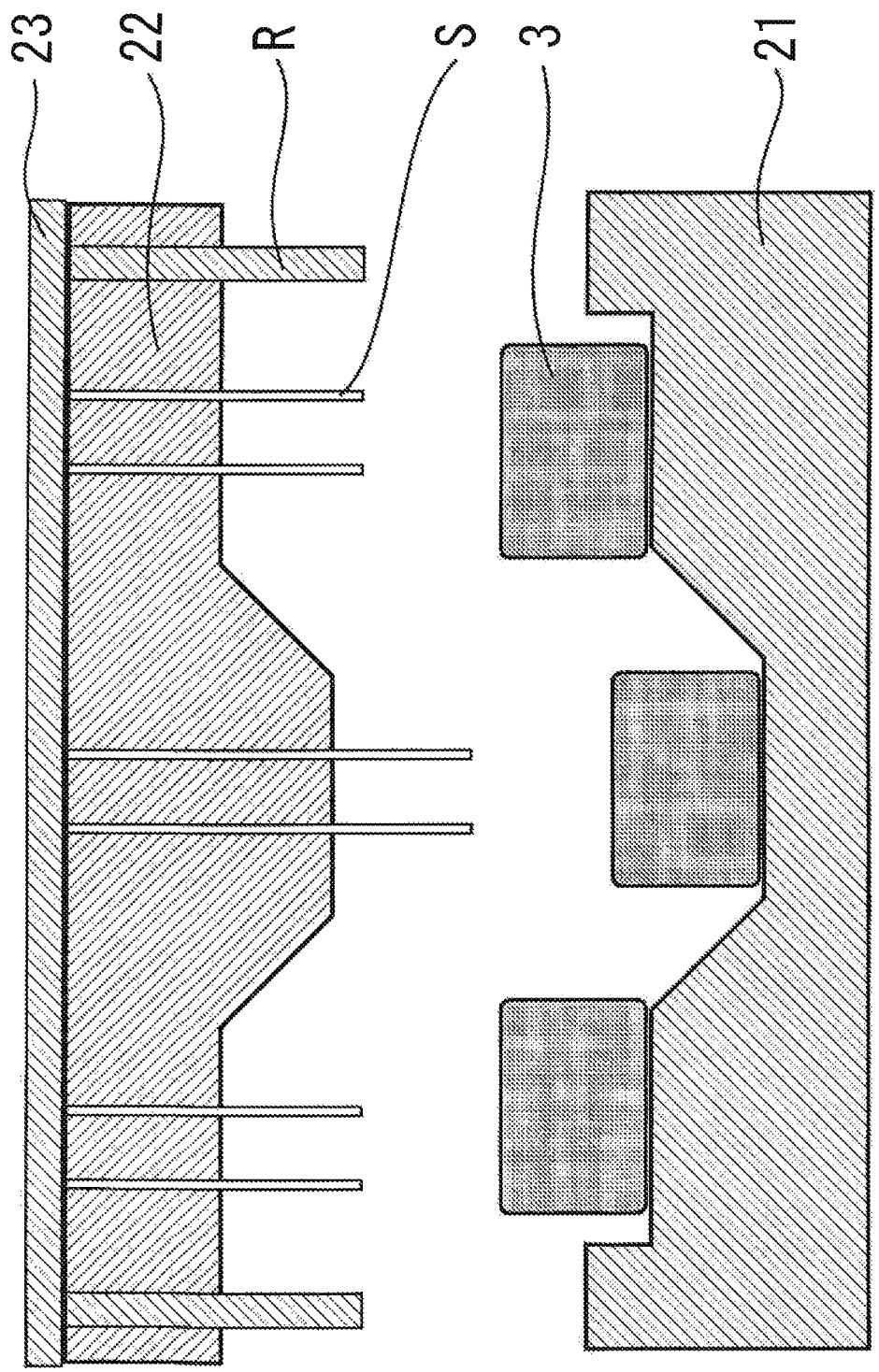
FIG. 5 is a schematic figure showing a state in which the COMPOUND is placed in a mold that is provided with spike shaped members.

As shown in FIG. 5, in the state in which the mold is open, the spike shaped members S project from the movable mold 22.

Figure 6:
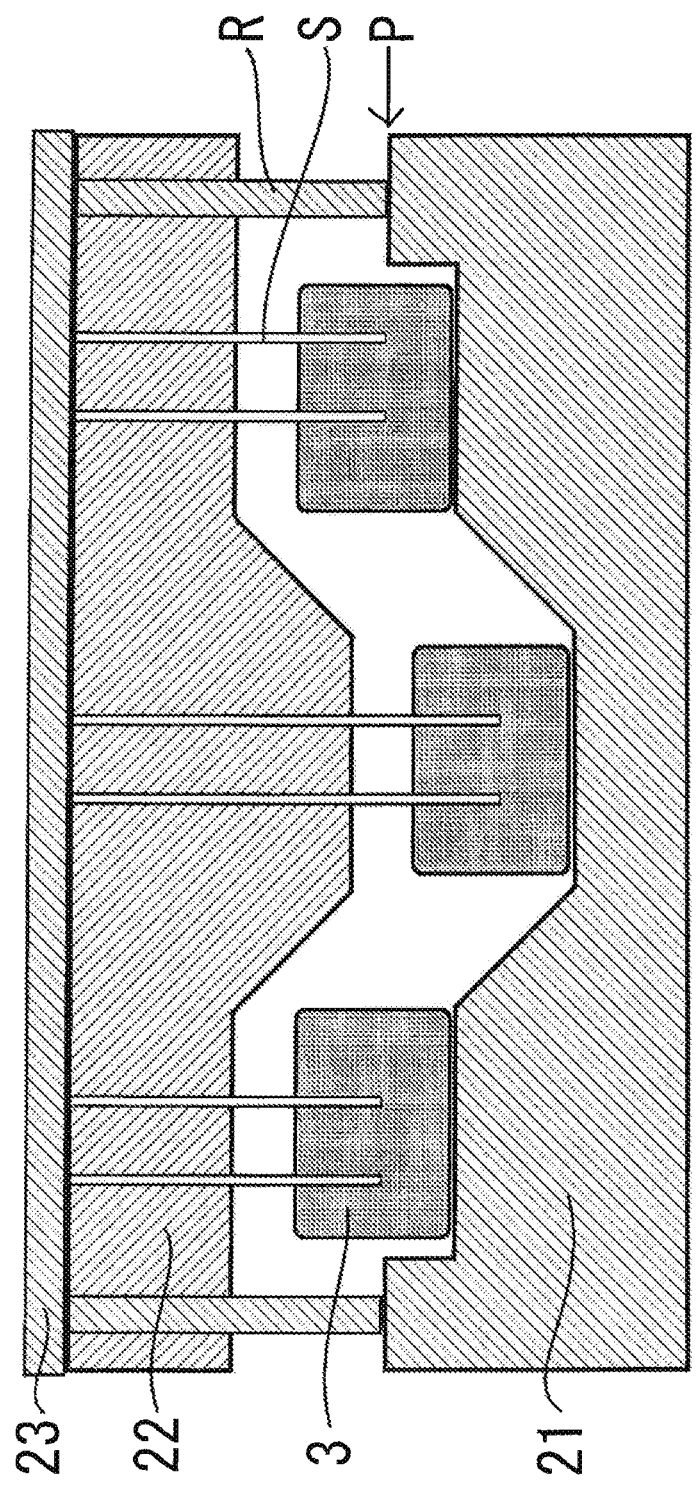
FIG. 6 is a schematic figure showing a state in which the COMPOUND is perforated by the spike shaped members of the mold.
Figure 7:
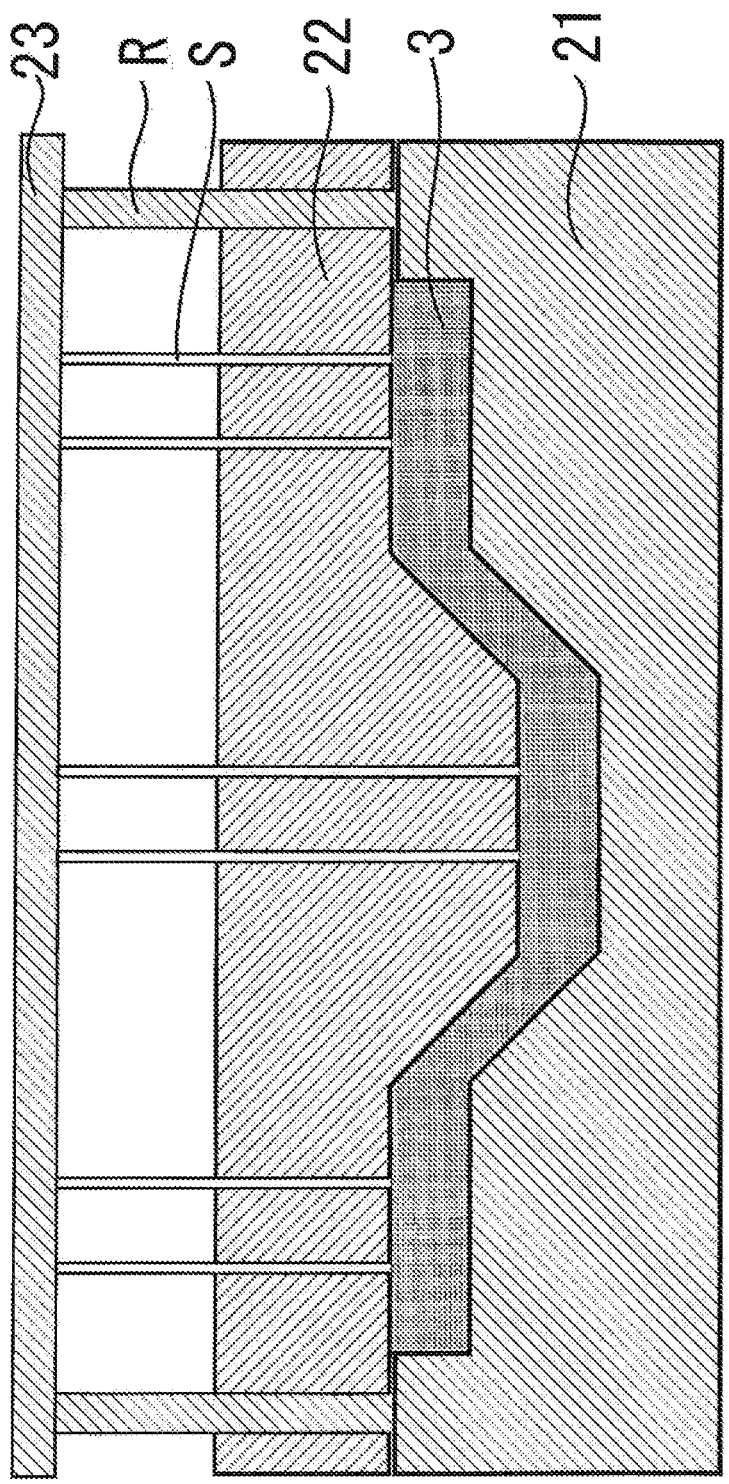
FIG. 7 is a schematic figure showing a state in which the COMPOUND is pressed by the mold that is provided with spike shaped members.

Then, by the movable mold 22 being approached toward the fixed mold 21, as shown in FIG. 6, the spike shaped members S stabs the COMPOUND 3 to form pores, and, as the movable mold 22 further approaches the fixed mold 21, as shown in FIG. 7, the spike shaped members S retract into the spike insertion pores, so that the spike shaped members S do not form any pores on the design face of the CFRP.

Instead of employing the return pin R, the spike shaped members S may be driven by hydraulic pressure. By providing a separate drive device for the spike shaped members S, it becomes possible to stab and to withdraw the spike shaped members S, independently of the process of opening and closing the mold.

Although a case has been explained in which the spike shaped members S are provided to the movable mold, it would also be possible, with the present invention, to provide the spike shaped members S to the fixed mold. Moreover, if the spike shaped members are not provided to the mold, then it is possible to employ a conventionally known mold.

EXAMPLES

In the following, the present invention will be explained in terms of more detailed examples thereof, but the present invention is not limited to the examples described below.

Example 1

A COMPOUND was obtained by melting nylon 6 (manufactured by Toyobo Co. Ltd.: T860) in a twin-screw kneading extruder, further conveying the molten nylon 6 to a twin-screw kneading extruder, and then by drawing carbon fiber (manufactured by Zoltek: 50K PX35) thereinto and kneading.

This COMPOUND had a weight average fiber length of 4.0 mm and a carbon fiber content of 50% by weight.

The shape of the COMPOUND was adjusted to a shape of around 120 mm length, around 30 mm width, and around 20 mm thickness, and then the COMPOUND was placed in the central part of a mold (200×200×2 mmt). At this time, the surface temperature of the COMPOUND was 230° C.

Next, pores were formed in the entire COMPOUND by stabbing with spike shaped members of diameter 5 mm to a depth of 1 mm. The intervals of the centers of the spike shaped members are arranged at regular intervals of 7.5 mm vertically and 10 mm horizontally.

And then a CFRP was obtained by holding for two minutes under the following conditions: movable mold at 200° C., fixed mold at 190° C., and pressure of 7 MPa.

Example 2

A CFRP was obtained in the same manner as in Example 1, except that pores were formed by stabbing with the spike shaped members to a depth of 3 mm.

Example 3

A CFRP was obtained in the same manner as in Example 1, except that pores were formed by stabbing with the spike shaped members to a depth of 5 mm.

Example 4

A CFRP was obtained in the same manner as in Example 1, except that pores were formed by stabbing with the spike shaped members to a depth of 10 mm.

Comparative Example 1

A CFRP was obtained in the same manner as in Example 1, except that a COMPOUND was not stabbed with any spike shaped members, Evaluation The appearance of the CFRPs produced in Examples 1 to 4 and Comparative Example 1 described above were evaluated as follows.

The results of evaluation are shown in Table 1.

Color Difference Evaluation

The colors of the surfaces of the CFRPs were measured according to JIS Z8730 by employing a color difference meter at 10 spots, and the color difference ($\Delta E$) was determined by using an injection molded body formed by the following method as a reference.

The injection molded body, as a reference, was produced by injection molding of a mixture-made body of nylon 6 (manufactured by Toyobo Co. Ltd.: 1860) including 50% by weight of carbon fiber (manufactured by Zoltek: 50K PX35) with fiber length of 0.3 mm, in the molten state.

Evaluation by Visual Inspection

The appearance of the CFRPs of Examples 1 to 4 and Comparative Example 1 was observed, and the presence or absence of molding defects, such as overlapping of flowing-like shapes in multiple layers, waves looking like being rolled and voids, was checked by visual inspection.

TABLE 1

| | Compound Surface Temperature (° C.) | Spike Depth (mm) | Color Difference ($\Delta E$) | Visual Evaluation |
| --- | --- | --- | --- | --- |
| Example 1 | 230° C. | 1 | 2.2 to 3.0 | Satisfactory |
| Example 2 | 230° C. | 3 | 1.5 to 2.4 | Satisfactory |
| Example 3 | 230° C. | 5 | 1.0 to 1.5 | Satisfactory |
| Example 4 | 230° C. | 10 | 0.6 to 1.0 | Satisfactory |
| Comparative Example | 230° C. | — | 3.7 to 7.3 | Marbling Patterns Present |

From the evaluation results described above, it is understood that whitening of the appearance can be prevented more, as the depth of the stabbing with the spike shaped members increased. It is considered that this is because gas in the COMPOUND was eliminated via the pores.

Moreover, with the CFRP of Comparative Example 1, marble pattern could be recognized, which is considered to be hardened parts of the surface of the COMPOUND. On the other hand, with the CFRPs of Examples 1 to 4, the poor appearance of marble pattern did not occur.

It is considered that this is because, by forming pores in the COMPOUND that penetrate through the hardened part of its surface, the surface of the CFRP was formed with internal parts with high fluidity of the COMPOUND, and the hardened parts on the surface of the COMPOUND were embedded in the interior of the CFRP.

REFERENCE SIGNS LIST

1: conveyance device
11: arm
12: holding portion
121: movable plate
2: molding device
21: fixed mold
22: movable mold
23: plate
3: COMPOUND
S: spike shaped member
R: return pin
P: parting line face

The invention claimed is:

1. A method for producing a carbon fiber reinforced resin molded article, the method comprising:
melting and kneading a carbon fiber and a thermoplastic resin to form a compound, the compound being not been completely hardened and comprising a portion that is in a molten state having fluidity;
forming a mixture-made body from the compound, the mixture-made body having a surface with a hardened part;
forming pores in the hardened part; and
after forming the pores, press-molding the mixture-made body.

2. The method of claim 1, wherein the pores are formed such that the pores are arranged regularly.

3. The method of claim 1, wherein the pores are formed such that the pores extend through at least a design face side of the mixture-made body.

4. The method of claim 3, wherein forming the pores comprises perforating the mixture-made body using a mold.

5. The method of claim 1, wherein forming the pores comprises is stabbing the mixture-made body with spike-shaped members.

6. The method of claim 5, wherein heat is applied to the spike-shaped members.

7. The method of claim 5, wherein:
the spike-shaped members are porous bodies; and
a gas in the mixture-made body is eliminated via the spike-shaped members.

8. The method of claim 1, wherein the melting and kneading comprises:
supplying the carbon fiber and the thermoplastic resin to a kneading machine; and
cutting the carbon fiber.

9. The method of claim 1, further comprising:
providing a press-molding device having a mold;
providing an apparatus comprising:
an arm, and
a holding portion provided to the arm;
holding the carbon fiber and the thermoplastic resin using the holding portion during the melting and kneading; and
placing the mixture-made body on the mold during the press-molding;
wherein:
at least one of:
the holding portion comprises spike-shaped members, or
the mold comprises spike-shaped members; and
forming the pores comprising stabbing the mixture-made body using the spike-shaped members.

10. The method of claim 9, further comprising:
providing a heat application device; and
applying heat to the spike-shaped members.

11. The method of claim 9, wherein the spike shaped members are porous bodies, and further comprising providing a suction device that sucks out a gas via the spike-shaped members.

12. The method of claim 2, wherein the pores are formed such that the pores extend through at least a design face side of the mixture-made body.

13. The method of claim 6, wherein:
the spike-shaped members are porous bodies; and
a gas in the mixture-made body is eliminated via the spike-shaped members.

14. The method of claim 2, wherein the melting and kneading comprises:
supplying the carbon fiber and the thermoplastic resin to a kneading machine; and
cutting the carbon fiber.

15. The method of claim 10, wherein the spike-shaped members are porous bodies, and further comprising providing a suction device that sucks out a gas via the spike-shaped members.

16. The method of claim 1, wherein:
the mixture-made body comprises an opposing surface opposite the surface; and
forming the pores comprises stabbing the mixture-made body using spike-shaped members without penetrating the opposing surface such that the pores extend through only a portion of a thickness of the mixture-made body.

17. A method for producing a carbon fiber reinforced resin molded article in which a mixture-made body in that a carbon fiber and a thermoplastic resin are melted and kneaded is press-molded, including a perforation step, in which pores are formed in the mixture-made body, before press-molding, the pores penetrating through at least a hardened part of a surface of the mixture-made body;
wherein the perforating is performed by stabbing the mixture-made body with spike-shaped members;
wherein the spike-shaped members are porous bodies; and
wherein a gas in the mixture-made body is eliminated via the spike-shaped members.

18. A method for producing a carbon fiber reinforced resin molded article in which a mixture-made body in that a carbon fiber and a thermoplastic resin are melted and kneaded is press-molded, including a perforation step, in which pores are formed in the mixture-made body, before press-molding, the pores penetrating through at least a hardened part of a surface of the mixture-made body;
wherein the perforating is performed by stabbing the mixture-made body with spike-shaped members;
wherein heat is applied to the spike-shaped members;
wherein the spike-shaped members are porous bodies; and wherein a gas in the mixture-made body is eliminated via the spike-shaped members.

\* \* \* \* \*